US011931912B2

(12) United States Patent
Khormaei et al.

(10) Patent No.: US 11,931,912 B2
(45) Date of Patent: Mar. 19, 2024

(54) KITCHEN KNIFE (71) Applicant: Steelport Kitchenware, Inc., Portland, OR (US)

(72) Inventors: Iranpour Khormaei, Vancouver, WA (US); Eytan Zias, Portland, OR (US); Patrick Scranton, Vancouver, WA (US)

(73) Assignee: STEELPORT KITCHENWARE, INC., Portland, OR (US)

( * ) Notice: Subject to any disclaimer, the term of this patent is extended or adjusted under 35 U.S.C. 154(b) by 304 days.

(21) Appl. No.: 17/450,001

(22) Filed: Oct. 5, 2021

(65) Prior Publication Data
US 2022/0105646 A1  Apr. 7, 2022

Related U.S. Application Data (60) Provisional application No. 63/087,729, filed on Oct. 5, 2020.

(51) Int. Cl.
 *B26B 3/02* (2006.01)
 *B21D 53/64* (2006.01)
 *B21D 53/70* (2006.01)
(52) U.S. Cl.
 CPC ............... *B26B 3/02* (2013.01); *B21D 53/64* (2013.01); *B21D 53/70* (2013.01)
(58) Field of Classification Search
 CPC ............ B26B 3/02; B21D 53/64; B21D 53/70
 (Continued)

(56) References Cited

U.S. PATENT DOCUMENTS 2,439,058 A * 4/1948 Lester .................... B21D 53/64
 30/342
4,349,961 A * 9/1982 Pendleton ............... B25G 3/08
 30/342
(Continued)

FOREIGN PATENT DOCUMENTS

EP  0003881030001  10/2005
EP  0006317340008  12/2006
(Continued)

OTHER PUBLICATIONS

Mosfiata Santoku Chef Knife, Representative Website Available at www.amazon.com/dp/B07T7F9FFC, Website Available as Early as Jul. 27, 2019, 2 pages.
(Continued)

*Primary Examiner* — Omar Flores Sanchez
(74) *Attorney, Agent, or Firm* — Alleman Hall & Tuttle LLP (57) ABSTRACT

Knives, handles for knives, and a method for making a knife are disclosed. In one example, a knife comprises a handle that includes a flat top surface, two upper chamfers, a flat bottom surface, and two curving sides. The top surface, the two chamfers, bottom surface, and two sides form a six-sided cross section shape. The width of the handle further varies along its length. A blade fastened to the handle comprises a tip at a distal end and a pinch radius configured to accommodate a user's finger. A spine is continuous with the handle's top surface and tapers from the handle to the tip. A cutting edge tapers along the length of the blade from the pinch radius to the tip. A bolster is between the handle and the blade and comprises a six-sided cross section shape that substantially matches the shape of the handle.

8 Claims, 5 Drawing Sheets (58) Field of Classification Search
USPC .......................................................... 30/340
See application file for complete search history.

(56) References Cited

U.S. PATENT DOCUMENTS

| | | | |
|---|---|---|---|
| 5,735,630 A * | 4/1998 | Keathley | B25G 3/28 |
| | | | 30/340 |
| D539,082 S | 3/2007 | Molayem | |
| D595,544 S | 7/2009 | Thun | |
| D649,841 S | 12/2011 | Lo | |
| D749,915 S | 2/2016 | Haas | |
| D809,339 S | 2/2018 | Lo | |
| D850,219 S | 6/2019 | Junfola | |
| 10,350,770 B1 | 7/2019 | Chen | |
| D896,594 S | 9/2020 | Tarrerias | |
| D937,048 S | 11/2021 | Chen | |
| 2002/0144410 A1 | 10/2002 | Hufnagel et al. | |
| 2003/0226263 A1 | 12/2003 | Fedor et al. | |
| 2006/0000314 A1 * | 1/2006 | Henry | B21D 53/64 |
| | | | 76/104.1 |
| 2007/0204471 A1 * | 9/2007 | Castagna | B25G 3/18 |
| | | | 30/342 |
| 2008/0276467 A1 | 11/2008 | Schmidt | |
| 2009/0158600 A1 | 6/2009 | Ishai | |
| 2012/0198707 A1 | 8/2012 | Blacken | |
| 2017/0165850 A1 | 6/2017 | Rigas | |
| 2017/0210021 A1 | 7/2017 | Lee | |
| 2017/0215613 A1 * | 8/2017 | Stein | A47G 21/08 |
| 2017/0341244 A1 * | 11/2017 | Chen | B26B 3/02 |
| 2018/0050434 A1 | 2/2018 | Nishihara | |
| 2019/0321992 A1 | 10/2019 | Nishihara | |
| 2021/0237288 A1 * | 8/2021 | Godfrey | B24B 3/54 |
| 2021/0345802 A1 * | 11/2021 | Elvin-Jensen | A47G 21/18 |
| 2022/0241954 A1 * | 8/2022 | Kwok | B26B 5/00 |

FOREIGN PATENT DOCUMENTS

| | | |
|---|---|---|
| GB | 90061562120006 | 2/2019 |
| KR | 3010186880000 | 8/2019 |
| KR | 3010437370000 | 2/2020 |

OTHER PUBLICATIONS

Brooklyn Santoku Knife, Representative Website Available at www.amazon.com/dp/B0815YHQJ5, Website Available as Early as Oct. 7, 2019, 3 pages.

Santoku Knife, Representative Website Available at www.amazon.com/dp/B0865TNBKC, Website Available as Early as May 8, 2020, 2 pages.

* cited by examiner

KITCHEN KNIFE

CROSS REFERENCE TO RELATED APPLICATIONS

This application claims priority to U.S. Provisional Patent Application Ser. No. 63/087,729, filed Oct. 5, 2020, the entirety of which is hereby incorporated herein by reference for all purposes.

BACKGROUND

Kitchen knives can be used and held for extended periods of time. A best in class knife is functional, easy to use, comfortable to hold, and aesthetically pleasing. Numerous aspects of a knife's configuration affect these qualities, such as the design and shape of the handle, the overall feel and weight, how the blade is shaped, and the materials selected for the blade and the handle.

In some examples, kitchen knives have utilized rectangular or simple round handle designs. However, typical knife handle designs often do not match the particular three-dimensional contours created by a hand holding the knife. For example, many knife handles include prominent edges at the bottom of the handle where the user's fingers normally curve. These and other aspects of the typical handle make these knives less than comfortable to hold, particularly for longer periods.

Furthermore, it is desirable to grip a kitchen knife, such as an 8" chef's knife, using a pinch hold above the bolster of the knife. This allows a user to exert finer control over the knife and apply pressure closer to the cutting edge. However, many knife designs use a straight heel with an uncomfortable spine below the bolster, making them ill-suited to being held in this manner, particularly for extended periods.

Another aspect of a knife is the blade width from handle to tip. For a chef's knife, it is desirable to have a wide blade as far as possible toward the tip. A Japanese-style K-tip knife substantially maintains the blade width before a sharp transition of the spine. A European-style tip primarily transitions the edge upwardly along the length of the blade. While these two styles are designed for particular cutting and slicing needs, they are not well-suited to performing other culinary tasks beyond the particular tasks for which they are designed.

SUMMARY

Various examples are disclosed herein that relate to knives and handles for knives configured to guide and encourage a user to hold the knife in a functional grip and to provide comfortable user experiences over extended periods of use, while also presenting an aesthetically-pleasing appearance. One example provides a knife comprising a handle that includes a substantially flat top surface, two upper chamfers each adjacent to a separate edge of the substantially flat top surface, a substantially flat bottom surface, and two sides that each curve between one of the two upper chamfers and the substantially flat bottom surface. The substantially flat top surface, the two upper chamfers, the substantially flat bottom surface, and the two sides form a six-sided cross section shape. The handle further comprises a width that varies along a length of the handle.

A blade is fastened to the handle, with the blade comprising, a tip at a distal end of the blade opposite the handle, a pinch radius opposite the tip, wherein the pinch radius is configured to accommodate a finger of the holder, a spine that tapers along a length of the blade from the handle to the tip, and a cutting edge that tapers along the length of the blade from the pinch radius to the tip. A bolster is positioned between the handle and the blade, with the bolster comprising a six-sided cross section shape that substantially matches the six-sided cross section shape of the handle.

Another example provides a wooden handle for a knife, the handle configured to guide and encourage a user to hold the knife in a functional grip and support comfortable use of the knife. The handle comprises a substantially flat top surface, two upper chamfers each adjacent to a separate side of the substantially flat top surface, a substantially flat bottom surface, and two sides that each curve between one of the two upper chamfers and the substantially flat bottom surface. The substantially flat top surface, the two upper chamfers, the substantially flat bottom surface, and the two sides form a six-sided cross section shape. The handle further comprises a width that varies along a length of the handle, wherein the width of the handle is configured to conform to a hand of a holder.

Another example provides a method of making a knife, the method comprising fabricating a one-piece handle using CNC machining, the handle comprising a substantially flat top surface, two upper chamfers each adjacent to a separate side of the substantially flat top surface, a substantially flat bottom surface, and two sides that each curve between one of the two upper chamfers and the substantially flat bottom surface. The substantially flat top surface, the two upper chamfers, the substantially flat bottom surface, and the two sides form a six-sided cross section shape. The handle further comprises a width that varies along a length of the handle.

The method includes forging a blade, a bolster, a tang, and an end cap, with the blade comprising a tip at a distal end of the blade opposite the handle, a pinch radius opposite the tip, wherein the pinch radius is configured to accommodate a finger of the holder, a spine that is continuous with the top surface of the handle and tapers along a length of the blade from the handle to the tip, and a cutting edge that tapers along the length of the blade from the pinch radius to the tip, wherein the bolster and the end cap each comprise a six-sided cross section shape that substantially matches the six-sided cross section shape of the handle. The handle is then fastened to the tang.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Examples are disclosed that relate to knives and handles for knives configured to guide and encourage a user to hold the knife in a functional grip and to provide a comfortable user experience over extended periods of use, while also presenting an aesthetically-pleasing appearance. In one example, a knife comprises a handle, a blade, and a bolster. The handle comprises a substantially flat (planar) top surface, two upper chamfers that are each adjacent to a side of the knife, and a substantially flat bottom surface. Each of the two sides gently curves between one of the upper chamfers and the flat bottom surface. As shown in FIGS. 3C-3F and discussed below, the substantially flat top surface, the two upper chamfers, the substantially flat bottom surface, and the two sides form a six-sided "shield shape" in cross section.

The handle further comprises a width (in the z-axis direction of FIG. 3A) that varies along a length of the handle, wherein the width of the handle is configured to conform to a hand of a holder. The handle is fastened to the blade of the knife via a tang, with the blade comprising a tip at a distal end opposite the handle, and a pinch radius between the tip and the handle. The pinch radius is configured to accommodate a finger of the holder. The blade also includes a spine that is continuous with the top surface of the handle and gently tapers along a length of the blade from the handle to the tip, and a cutting edge that tapers along the length of the blade from the pinch radius to the tip. The bolster of the knife comprises a contoured six-sided cross section that substantially matches the contoured six-sided cross section of the handle.

As described in more detail below, this configuration guides and encourages a user to hold the knife in a desirable, comfortable and easily-controlled pinch grip at the bolster. In addition, the multiple functional features of this configuration, including the handle shape, pinch hold area, blade shape, and center of mass, combine to provide the knife with a comfortable balance and feel. Each of these features can add value independently or be combined in other configurations to provide increased capabilities.

Figure 1:
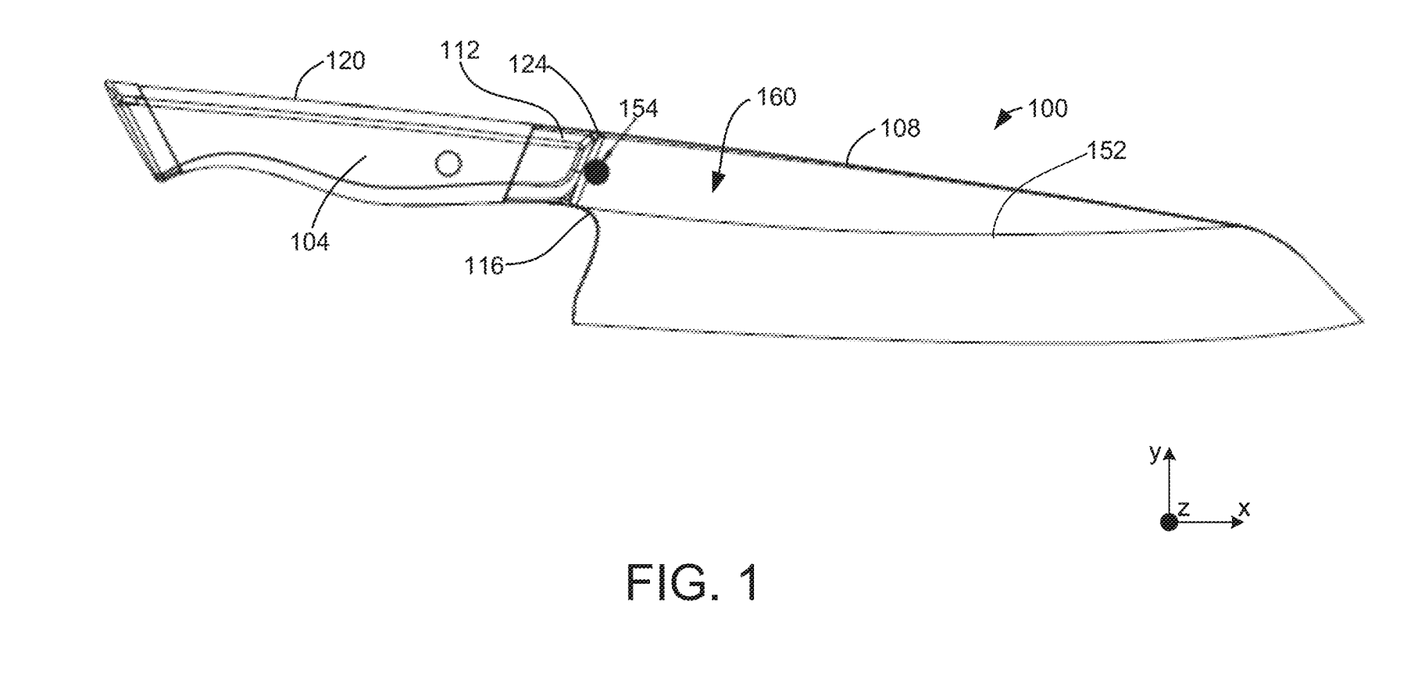
FIG. 1 shows a kitchen knife according to examples of the present disclosure.
Figures 2A, 2B:
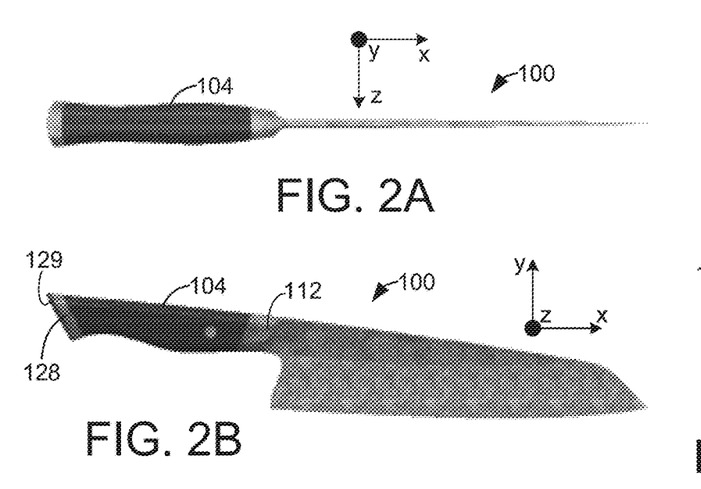
FIGS. 2A-2H show the kitchen knife of FIG. 1 as viewed from different angles.
Figures 2C, 2D:
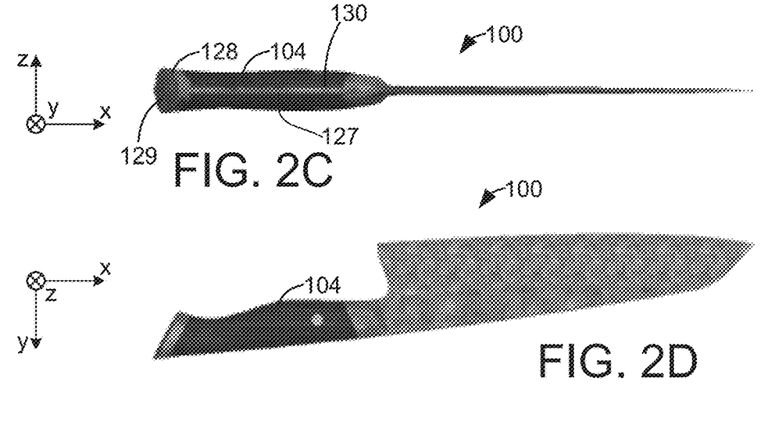
Figure 2E:
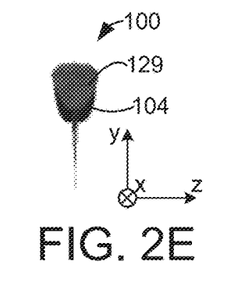
Figures 2F, 2G:
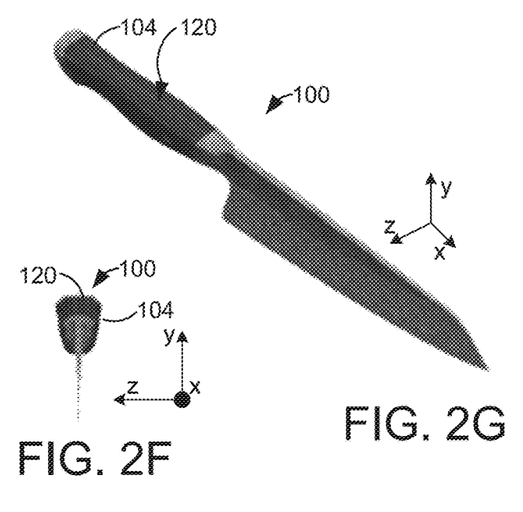
Figure 2H:
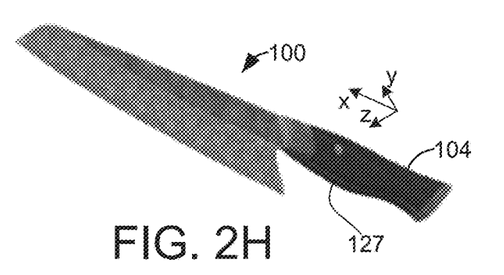

With reference now to FIG. 1, the kitchen knife 100 includes a wooden handle 104, a blade 108 fastened to the wooden handle 104 via tang 127 (see also FIGS. 2C and 2H), and a bolster 112 positioned between the wooden handle 104 and the blade 108. As described in more detail below, the wooden handle 104 includes a six-sided, "shield-shaped" cross-section that varies in size along the length of the handle. A pinch radius 116 is provided in the blade 108 to comfortably accommodate a user's finger when the user's grips the handle 104.

The handle 104 is configured to match the holding hand curvature in all three dimensions. In one potential advantage of this configuration, and with reference also to FIGS. 3A-3F, a continuous three-dimensional "bulge" feature is provided by varying the width (z-axis direction) of the handle along its length (in the x-axis direction) in a middle portion 125, such that both sides 126a, 126b of the handle gently curve outwardly to form a slight bulge on each side in the middle portion. Alternatively expressed, and as described below with reference to FIGS. 3A-3F, this "bulge" feature is created by widening and then narrowing the width of the handle along the positive x-axis direction. This shield-shaped bulge feature is desirable but challenging and time-consuming to create manually from wood. Accordingly, the present handle configuration may be generated from wood more efficiently and in greater quantities using CNC (computer numerical control) machine tools. In other examples, the handle may be fabricated from other materials, such as resin-impregnated laminates reinforced with carbon fiber, fiberglass, cotton cloth, or other substrates.

With reference again to FIG. 1, the illustration of the kitchen knife 100 shows the center of mass 156 of the knife. The center of mass 156 is located where a planar surface 160 of the blade 108 intersects with the bolster 112 and is configured to provide a neutral and balanced feel when the knife is held by a user, particularly when a user's index finger us curled under the pinch radius 116. By positioning the center of mass 156 in this manner, the knife 100 is more comfortably and easier controlled and manipulated by the user.

FIGS. 2A-2H show the kitchen knife of FIG. 1 as viewed from different angles.

With reference now to FIGS. 3A-3F, different views and cross sections of the kitchen knife 100 include dimensions of the handle 104 in inches. As illustrated by example in FIGS. 3A-3F, the handle 104 comprises a six-sided "shield-shaped" cross section. As described further below, FIGS. 3C-3F show example cross-sections of the handle 104 along lines 1-1, 2-2, 3-3, and 4-4, respectively, of FIG. 3B.

Figure 3A:
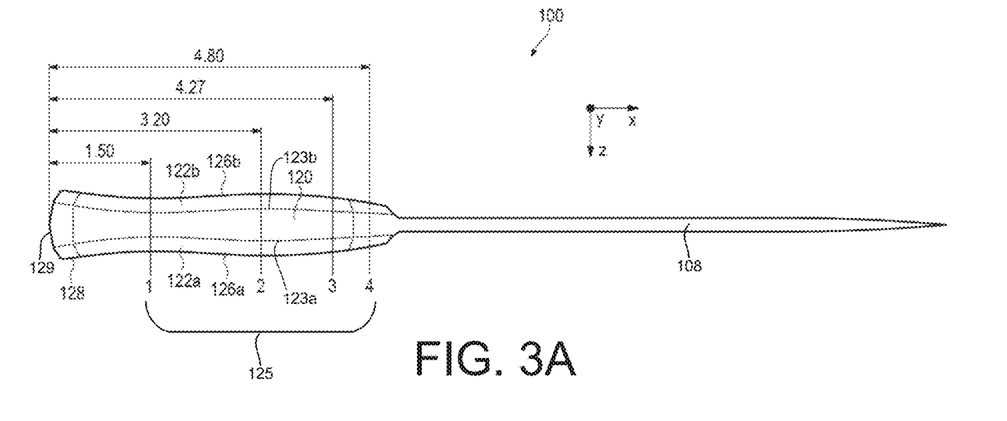
FIG. 3A shows a top view of the kitchen knife of FIG. 1 that includes example dimensions of the handle and bolster according to examples of the present disclosure.
Figure 3B:
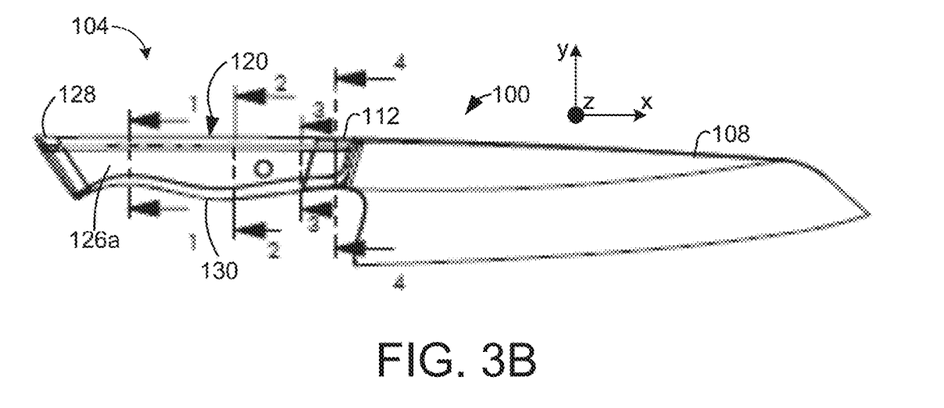
FIG. 3B shows a side view of the kitchen knife of FIG. 1 according to examples of the present disclosure.
Figures 3C, 3D:
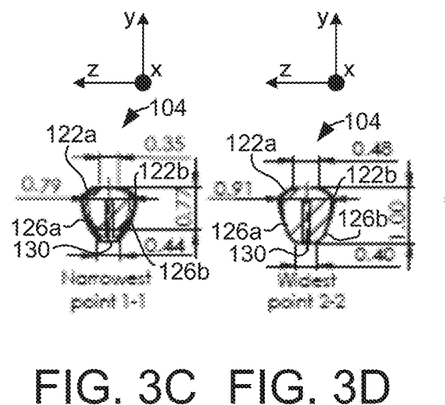
FIG. 3C shows a cross-section drawing along line 1-1 of FIG. 3B that shows the profile and dimensions of the handle at its narrowest point.
FIG. 3D shows a cross-section drawing along line 2-2 of FIG. 3B that shows the profile and dimensions of the handle at its widest point.
Figure 3E:
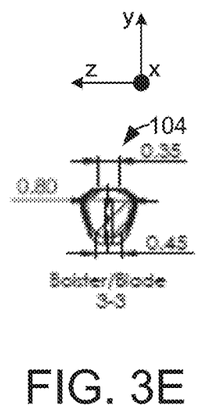
FIG. 3E shows a cross-section drawing along line 3-3 of FIG. 3B that shows the shape and dimensions of the handle at a rear edge of the bolster.

As best seen in FIG. 3A, the handle 104 comprises a substantially flat top surface 120 and two upper chamfers 122a, 122b. Each of the upper chamfers 122a, 122b is adjacent to a separate edge 123a, 123b, respectively, of the substantially flat top surface 120. The handle 104 further comprises two sides 126a, 126b that each curve slightly between the chamfers 122a, 122b, respectively, and the bottom surface 130 of the handle 104. As shown in FIG. 3B, the bottom surface 130 also curves in a gentle "S" shape in the positive x-axis direction, while having a substantially flat profile in cross section as shown in FIGS. 3C-3E.

Advantageously, the six-sided "shield-shaped" cross section of the handle 104 combined with the "bulge" feature described above help a user to index the knife. When the user grasps the handle 104, the shape of the handle guides the user's hand to a comfortable and controlled holding position. The substantially flat top surface 120 provides a comfortable resting surface and distributed pressure area at top of the handle for the holder's palm to rest on. As the holder's fingers wrap around the handle 104, the gently curving sides 126a and 126b provide a more comfortably shaped handle for the holder to grip. Keeping the lower sides of the handle slightly curved also avoids pressure points in the holder's fingertips while holding the knife.

The handle 104 is further configured to match the holder's hand shape to provide stability and comfort with use over time. More particularly and as discussed above, the three-dimensional "bulge" feature provides a width that varies along a length of the handle. FIGS. 3A-3F illustrate dimensions of this three-dimensional "bulge" feature. As shown in FIGS. 3C and 3D, the width of the handle 104 is approximately 0.79 in. at a narrowest part of the handle shown in cross section 1-1, and smoothly grows to 0.91 in. at the widest part of the handle shown in cross section 2-2. In different examples, each of these widths may vary in the range of +/−0.2 in. to accommodate different hand sizes. In some examples, a difference between the width at the narrow part at cross section 1-1 and the thickest part at cross section 2-2 is approximately 12%. In other examples, the width can differ in the range of 7%-20%. This change in width along the length of the handle creates the three-dimensional "bulge" feature, and heightens a holder's perception and feel of an increased palm swell area.

Figure 3F:
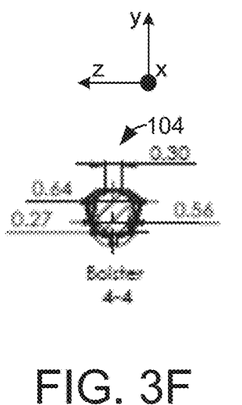
FIG. 3F shows a cross-section drawing along line 4-4 of FIG. 3B that shows the shape and dimensions of the bolster.

As illustrated by example in FIGS. 3A-3F, the knife 100 includes a bolster 112. As shown in FIG. 3F, the bolster 112 also comprises a contoured six-sided "shield" cross section shape that substantially matches the contoured six-sided cross section shape of the wooden handle, while having a smaller overall cross-sectional area compared to the cross-sectional area of the handle as indicated by the dimensions shown in FIG. 3F. For example, and as shown, the widest width of the bolster at the cross section 4-4 is 0.64 in., while the widest width of the handle at its narrowest point at cross section 1-1 is 0.79 in. As illustrated by example in FIGS. 2E and 3A-3F, the six-sided "shield shape" cross section continues from the end cap 129 and extended tang 128 of the blade 108 at a distal end of the handle 104 through the handle 104 and bolster 112, with the size and area of this six-sided shape varying along the length of the handle to create the bulge feature described above.

Figure 4A:
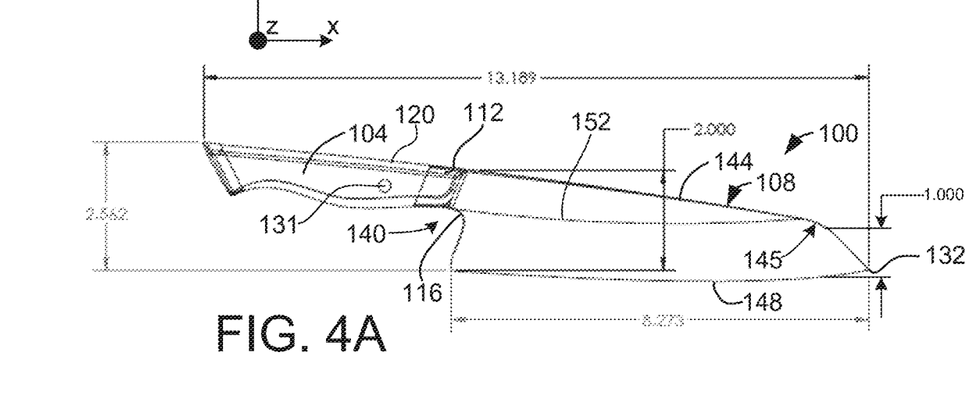
FIGS. 4A-4C show different views of the kitchen knife of FIG. 1 along with various dimensions.
Figure 4B:
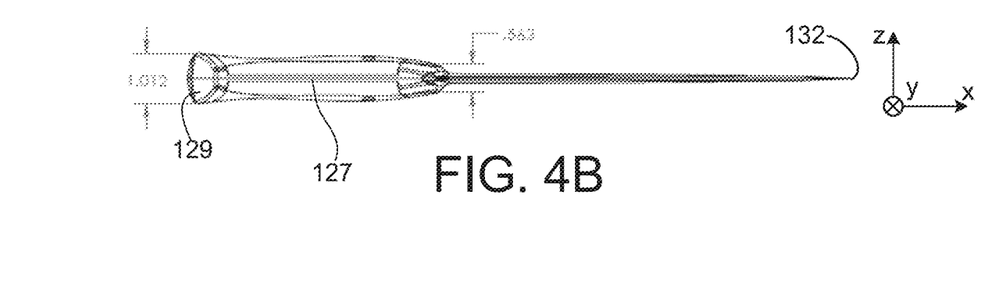
Figure 4C:
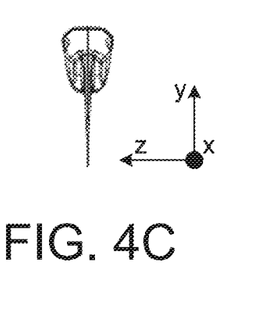

With reference now to FIGS. 4A-4C, additional views of the kitchen knife 100 are provided and include other dimensions in inches. As introduced above, the blade 108 is fastened to the handle 104 via tang 127 and rivet 131 and includes a tip 132 at a distal end of the blade. The blade 108 also includes a pinch radius 116 located in the heel 140 of the knife. In the illustrated example, the pinch radius 116 comprises a radius of approximately 0.28 in. In other examples, the pinch radius 116 is in the range of 0.15 in.-0.5 in.

As shown in FIGS. 2-4, the contoured bolster 112 is positioned adjacent to the pinch radius 116. The curved bolster 112 and the pinch radius 116 work together to accommodate one or more fingers of the holder. The "shield shape" of the contoured six-sided bolster 112 follows a typical finger curvature to allow a better grip and natural placement of fingers.

With continued reference to FIGS. 4A-4D, the blade 108 comprises a spine 144 that is continuous (flush) with the top surface of the handle 104 and bolster 112. The blade 108 further comprises a cutting edge 148 that gently curves upwardly along the length of the blade 108 from the heel 140 to the tip 132. As illustrated in FIG. 4A, the width of the blade 108 in the y-axis direction gently tapers from 2.0 in. at the heel 140 to 1.0 in. at a point adjacent to the tip 132 where the spine 144 curves downwardly to the tip. In the present example and at this point, the spine 144 curves with a radius 145 of approximately 1.3 in. (33 mm) towards the cutting edge 148 to form the tip 132. In other examples, the radius is in the range of 0.5 in. to 1.8 in.

In another potential advantage of the present disclosure, the configuration of this spine curvature to the tip 132 is between a K-tip (which has a clear corner) and standard chef knife (which smoothly narrows to the tip). Advantageously, this configuration allows the blade 108 to reach a sharp tip 132, with a smoothly rounded contoured transition, while keeping the blade generally wide along a substantial portion of the length of the blade. Advantageously, the extended wide portion of the blade 108 provides a substantial working surface to cut through thicker material with a more uniform cut across large pieces, while the curvature provides a sharp tip, which is desirable for chef knives. This curvature of the blade near the tip 132 further provides clearance for the user's knuckles in the other hand when holding a food item during cutting/chopping. In this manner, this configuration helps to protect the holder's hand during use. Accordingly, this combination of features provides a unique and desirable functional versatility.

As illustrated by example in FIGS. 1 and 4A, the knife 100 further comprises a temper line 152. The temper line 152 is a result of differential heat treatment of the knife blade 108. The differential heat treatment provides the blade 108 with a softer spine 144 and a hard cutting edge 148, along with providing a distinctive appearance. The harder steel at the cutting edge 148 enables the edge to better receive and maintain a sharper edge for improved performance. At the same time, the softer steel in the spine 144 improves the durability and chip resistance of the knife 100. The location and smooth upwardly curving design of the temper line also provides the knife with a distinctive and aesthetically pleasing appearance.

In some examples, the blade 108, bolster 112, tang 127, extended tang 128, and end cap 129 are forged as a single component. Prior to inserting and affixing the tang 127 of the blade 108 to the handle 104, the tang may be shaped via machining or other finishing technique(s) to closely fit into the opening in the handle. In other examples, one or more of the blade 108, bolster 112, tang 127, extended tang 128, and end cap 129 are forged as a separate components. For example, the blade 108, the bolster 112, the tang 127 and extended tang 128 may be forged as a single component, and a separately fabricated end cap may be affixed to the extended tang 128 portion of the tang 127, such as via a mechanical fastener.

Figure 5:
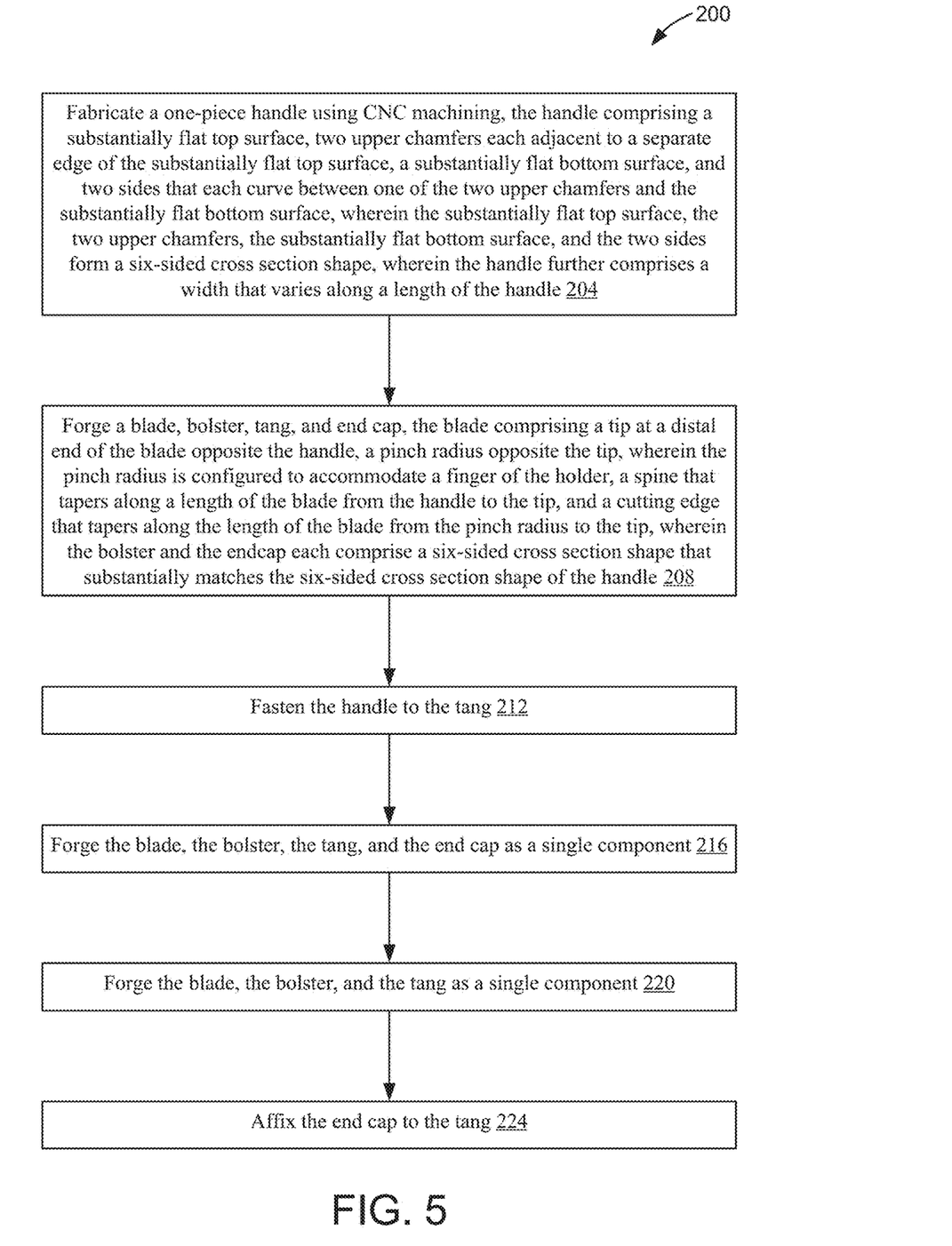
FIG. 5 shows a flowchart illustrating a method of making a knife.

FIG. 5 shows a flowchart illustrating a method 200 of making a knife according to examples of the present disclosure. Method 200 may be implemented to make the example configurations of knife 100 as described above and other configurations as contemplated by the present disclosure. The following description of method 200 is provided with reference to the components described herein and shown in FIGS. 1-4.

The following description of method 200 is provided by way of example and is not meant to be limiting. Therefore, it is to be understood that method 200 may include additional and/or alternative steps relative to those illustrated in FIG. 5. It will also be appreciated that method 200 also may be performed in other contexts using other suitable components.

The method 200 comprises, at 204, fabricating a one-piece handle using CNC machining, the handle comprising a substantially flat top surface, two upper chamfers each adjacent to a separate edge of the substantially flat top surface, a substantially flat bottom surface, and two sides that each curve between one of the two upper chamfers and the substantially flat bottom surface, wherein the substantially flat top surface, the two upper chamfers, the substantially flat bottom surface, and the two sides form a six-sided cross section shape, and wherein the handle further comprises a width that varies along a length of the handle.

At 208 the method 200 comprises forging a blade, a bolster, a tang, and an end cap, the blade comprising a tip at a distal end of the blade opposite the handle, a pinch radius opposite the tip, wherein the pinch radius is configured to accommodate a finger of the holder, a spine that tapers along a length of the blade from the handle to the tip, and a cutting edge that tapers along the length of the blade from the pinch radius to the tip, and wherein the bolster and the endcap each comprise a six-sided cross section shape that substantially matches the six-sided cross section shape of the handle. At 212 the method 200 comprises fastening the handle to the tang, such as via a mechanical fastener. At 216 the method 200 comprises forging the blade, the bolster, the tang, and the end cap as a single component. At 220 the method 200 comprises forging the blade, the bolster, and the tang as a single component. At 224 the method 200 comprises affixing the end cap to the tang.

The following paragraphs provide additional support for the claims of the subject application. One aspect provides, a knife, comprising: a handle comprising, a substantially flat top surface, two upper chamfers each adjacent to a separate edge of the substantially flat top surface, a substantially flat bottom surface, and two sides that each curve between one of the two upper chamfers and the substantially flat bottom surface, wherein the substantially flat top surface, the two upper chamfers, the substantially flat bottom surface, and the two sides form a six-sided cross section shape, wherein the handle further comprises a width that varies along a length of the handle; a blade fastened to the handle, the blade comprising, a tip at a distal end of the blade opposite the handle, a pinch radius opposite the tip, wherein the pinch radius is configured to accommodate a finger of the holder, a spine that tapers along a length of the blade from the handle to the tip, and a cutting edge that tapers along the length of the blade from the pinch radius to the tip; and a bolster positioned between the handle and the blade, the bolster comprising the six-sided cross section shape. The knife may additionally or alternatively include, wherein the varying width of the handle creates a bulge feature between an extended tang of the blade and the bolster. The knife may additionally or alternatively include, wherein the varying width of the handle comprises a first width at a narrowest part of the handle and a second width wider than the first width at a widest part of the handle that is between the narrowest part and the bolster.

The knife may additionally or alternatively include, wherein the spine is continuous with the substantially flat top surface of the handle. The knife may additionally or alternatively include, wherein the six-sided cross section shape of the bolster has a first cross-sectional area that is less than a second cross-sectional area of the six-sided cross section shape of the handle. The knife may additionally or alternatively include, wherein a width of the blade tapers from 2.0 inches at a heel of the blade to 1.0 inch adjacent to the tip where the spine curves downwardly to the tip.

Another aspect provides a wooden handle for a knife, the handle configured to guide a user to hold the knife in a functional grip and support comfortable use of the knife, the handle comprising: a substantially flat top surface; two upper chamfers each adjacent to a separate edge of the substantially flat top surface; a substantially flat bottom surface; and two sides that each curve between one of the two upper chamfers and the substantially flat bottom surface; wherein the substantially flat top surface, the two upper chamfers, the substantially flat bottom surface, and the two sides form a six-sided cross section shape; wherein the handle further comprises a width that varies along a length of the handle; and wherein the width of the handle is configured to conform to a hand of a holder. The handle may additionally or alternatively include, wherein the varying width of the handle creates a bulge feature between an extended tang of the blade and the bolster. The handle may additionally or alternatively include, wherein the varying width of the handle comprises a first width at a narrowest part of the handle and a second width wider than the first width and spaced from the narrowest part.

Another aspect provides a method of making a knife, the method comprising: fabricating a one-piece handle using CNC machining, the handle comprising, a substantially flat top surface, two upper chamfers each adjacent to a separate edge of the substantially flat top surface, a substantially flat bottom surface, and two sides that each curve between one of the two upper chamfers and the substantially flat bottom surface, wherein the substantially flat top surface, the two upper chamfers, the substantially flat bottom surface, and the two sides form a six-sided cross section shape, wherein the handle further comprises a width that varies along a length of the handle; forging a blade, a bolster, a tang, and an end cap, the blade comprising, a tip at a distal end of the blade opposite the handle, a pinch radius opposite the tip, wherein the pinch radius is configured to accommodate a finger of the holder, a spine that tapers along a length of the blade from the handle to the tip, and a cutting edge that tapers along the length of the blade from the pinch radius to the tip, wherein the bolster and the end cap each comprise a six-sided cross section shape that substantially matches the six-sided cross section shape of the handle; and fastening the handle to the tang. The method may additionally or alternatively include forging the blade, the bolster, the tang, and the end cap as a single component. The method may additionally or alternatively include forging the blade, the bolster, and the tang as a single component. The method may additionally or alternatively include affixing the end cap to the tang.

It is to be understood that the configurations and/or approaches described herein are exemplary in nature, and that these specific embodiments or examples are not to be considered in a limiting sense. The specific routines or methods described herein may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

It will also be appreciated that references to "one embodiment", "an embodiment", "one example", or "an example" are not intended to be interpreted as excluding the existence of additional embodiments or examples that also incorporate the recited features. Unless explicitly stated to the contrary, embodiments or examples "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," and "second," etc. are used merely as labels, and are not intended to impose numerical requirements or a particular positional order on their objects.

The invention claimed is:

1. A knife, comprising:
 a handle comprising,
  a substantially flat top surface,
  two upper chamfers each adjacent to a separate edge of the substantially flat top surface, a substantially flat bottom surface, and two sides that each curve between one of the two upper chamfers and the substantially flat bottom surface, wherein the substantially flat top surface, the two upper chamfers, the substantially flat bottom surface, and the two sides form a six-sided cross section shape, wherein the handle further comprises a width that varies along a length of the handle;

a blade fastened to the handle, the blade comprising, a tip at a distal end of the blade opposite the handle, a pinch radius opposite the tip, wherein the pinch radius is configured to accommodate a finger of the holder, a spine that tapers along a length of the blade from the handle to the tip, and a cutting edge that tapers along the length of the blade from the pinch radius to the tip; and a bolster positioned between the handle and the blade, the bolster comprising the six-sided cross section shape.

2. The knife of claim 1, wherein the varying width of the handle creates a bulge feature between an extended tang of the blade and the bolster.

3. The knife of claim 2, wherein the varying width of the handle comprises a first width at a narrowest part of the handle and a second width wider than the first width at a widest part of the handle that is between the narrowest part and the bolster.

4. The knife of claim 1, wherein the spine is continuous with the substantially flat top surface of the handle.

5. The knife of claim 1, wherein the six-sided cross section shape of the bolster has a first cross-sectional area that is less than a second cross-sectional area of the six-sided cross section shape of the handle.

6. The knife of claim 1, wherein a width of the blade tapers from 2.0 inches at a heel of the blade to 1.0 inch adjacent to the tip where the spine curves downwardly to the tip.

7. A wooden handle for a knife, the handle configured to guide a user to hold the knife in a functional grip and support comfortable use of the knife, the handle comprising:

a substantially flat top surface;

two upper chamfers each adjacent to a separate edge of the substantially flat top surface;

a substantially flat bottom surface; and two sides that each curve between one of the two upper chamfers and the substantially flat bottom surface;

wherein the substantially flat top surface, the two upper chamfers, the substantially flat bottom surface, and the two sides form a six-sided cross section shape;

wherein the handle further comprises a width that varies along a length of the handle to create a bulge feature between an extended tang of a blade of the knife and a bolster of the knife; and wherein the width of the handle is configured to conform to a hand of a holder.

8. The wooden handle of claim 7, wherein the varying width of the handle comprises a first width at a narrowest part of the handle and a second width wider than the first width and spaced from the narrowest part.

* * * * *